Feb. 14, 1961 S. O. SAMPSON 2,971,716

AUTOMATIC TAPE CARTRIDGE FOR MAGNETIC RECORDERS

Filed May 25, 1959 2 Sheets-Sheet 1

INVENTOR.
SIDNEY O. SAMPSON
BY
ATTORNEY

AUTOMATIC TAPE CARTRIDGE FOR MAGNETIC RECORDERS

Filed May 25, 1959 2 Sheets-Sheet 2

INVENTOR.
SIDNEY O. SAMPSON
BY
Zoltan H. Polachek
ATTORNEY

United States Patent Office 2,971,716

Patented Feb. 14, 1961

2,971,716

AUTOMATIC TAPE CARTRIDGE FOR MAGNETIC RECORDERS

Sidney O. Sampson, 216 E. 31st St., New York, N.Y.

Filed May 25, 1959, Ser. No. 815,349

2 Claims. (Cl. 242—55.13)

This invention relates to the art of magnetic recorders, and particularly concerns a tape cartridge for use in an automatic recording apparatus.

A principal object of the invention is the provision of a magazine or cartridge for magnetic recording tape adapted for use in an apparatus provided with means for automatically reversing and stopping the tape at opposite ends of travel of the tape between supply and takeup reels.

A further object is the provision of a tape magazine or cartridge with tape consisting of a transparent plastic base coated with opaque magnetic material and having leading and trailing ends of the tape clear and uncoated.

A still further object is the provision of a tape magazine or cartridge with an optical reflecting element adapted to coact with the transparent portions of the tape for actuating a photoelectric control device in the recorder.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
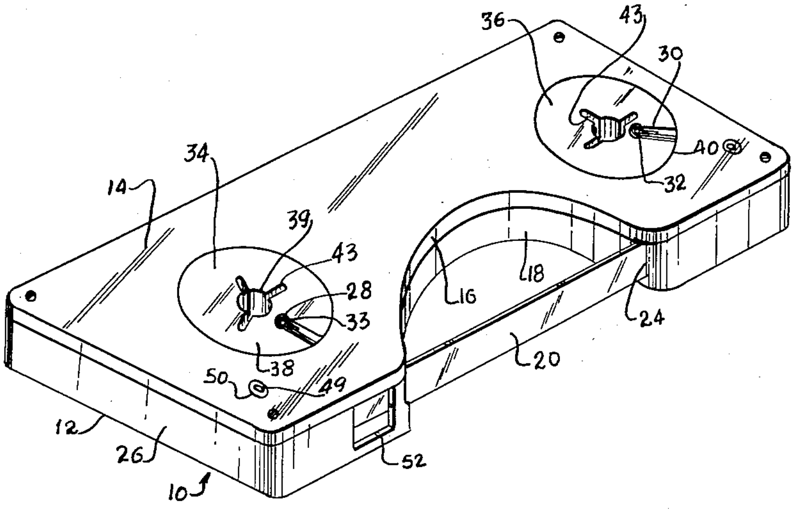
Fig. 1 is a perspective view of a tape magazine or cartridge embodying the invention.
Figure 2:
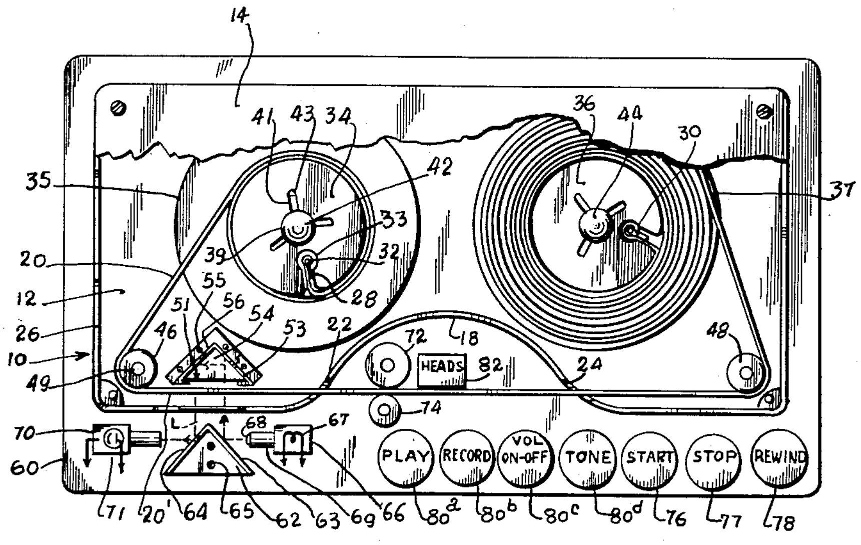
Fig. 2 is a plan view of the magazine or cartridge mounted on a magnetic tape recorder, a portion of the cover of the magazine being broken away to show internal parts.

In Figs. 1 and 2 is shown a tape magazine or cartridge 10 including a substantially rectangular base 12 made of metal or plastic. On the base 12 is removably mounted by screws or by a frictional fit, a substantially rectangular cover 14. Both base and cover have registering arcuate indentations 16 and 18. Magnetic tape 20 extends across a space partially defined by this indentation, and passes through slots 22, 24 in the vertical wall 26 of the base. Opposite ends of the tape are formed with loops 28, 30 respectively engaged on pins 32 centrally disposed in apertures 33 formed in hubs 34, 36 of reels 35, 37. Round holes 38, 40 are formed in the cover 14 in which the upper ends of the hubs are journaled for rotation. The reels are mounted on spindles 42, 44, having outwardly extending keys 41 engaged in slits 43 in the hubs radiating from holes 39. Idler guide rollers 46, 48 are located near the corners of the base and guide the tape between the reels and slots 22, 24. The shafts 49 of the rollers are journaled in bearing elements 50 in the cover. An opening or window 52 is formed in the front wall of the base. Adjacent this opening is an optical prism 54 disposed in a bracket or socket 56 secured to the base by screws 55.

This prism is preferably a 45°–45°–90° element having sides 51 and 53 inclined oppositely at 45° to the tape section 20' which passes in front of the prism parallel to its base 57, and inside opening 52.

In Fig. 2, the tape magazine 10 is shown removably mounted on a recorder 60 which includes a tape drive mechanism of which the spindles 42 and 44 are parts. Disposed in front of the openings 52 is an optical element 62 which has two mirror surfaces 63, 64 disposed at right angles to each other. The mirror element is secured to the recorder base 61 by screws 65. Adjacent to the reflective surface 63 is a housing 66 containing an incandescent lamp 67. The housing has a forward light projecting tube 69 in which is mounted a lens 68 for concentrating the lamp light into a fine, intense beam upon surface 63. Adjacent to reflective surface 64 is another housing 71 containing a photoelectric cell 70. It is preferred that the lamp emit a particular color light such as red, green, or blue. The photoelectric cell will be one which is not affected by ordinary daylight or incandescent light but responds only to concentrated light beams of a particular color. Such photoelectric cells are made of cadmium sulphide, cadmium selenide, and the like.

The recorder has a capstan 72 located in the recessed or indented portion of the cartridge for driving the tape at constant speed. An idler roller 74 is disposed adjacent to the capstan for coaction therewith in driving the tape. The recorder is provided with start, stop, and rewind buttons 76—78 for controlling rotation of the reels and movement of the tape. Other buttons or control knobs 80A—80D operate the sound recording and sound reproducing apparatus of the recorder. A magnetic recording and reproducing head assembly 82 is mounted on the recorder adjacent the tape in its path of travel from reel to reel. The head assembly is disposed in the indentation formed in the case of the cartridge.

Figure 3:
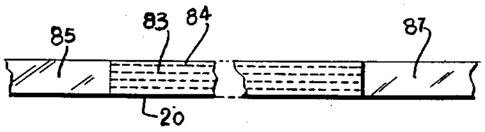
Fig. 3 is a fragmentary plan view of a magnetic tape with transparent ends employed in the magazine.

In operation of the recorder, the tape is driven from one reel to the other past the recording head assembly for playing or recording sound signals. The tape 20 has the construction indicated best in Fig. 3. An opaque magnetic coating 84 on a transparent plastic film base 86 has one or more recording tracks 83 thereon. In the drawing four tracks are indicated, but more or less tracks may be used. The present invention is directed primarily at the cartridge structure and photoelectric means for reversing direction of travel of the tape and for stopping the tape so the number of recording tracks on the tape is immaterial as far as the invention is concerned. The invention involves the proper employment of the transparent leading and trailing ends 85 and 87 of the tape. These ends may be about forty inches or so in length. Their free ends are formed into the loops 28 and 30 shown in Figs. 1 and 2 engaged on the pins 32. According to the invention it is desired that the tape be reversed in its direction of movement at the end of travel in one direction while recording or reproducing sound on one or more tracks. The reversely moving tape may then be driven at the same speed as previously if it is desired to record or reproduce sound on one or more other tracks, or the tape can be rewound at high speed after reversal. In any case it in desired that the tape be stopped automatically after travel in the reverse direction is completed. The transparent ends of the tape beyond the opaque magnetic section enable this automatic control to be achieved with the aid of the photoelectric controlled system shown to best advantage in Fig. 4.

Figure 4:
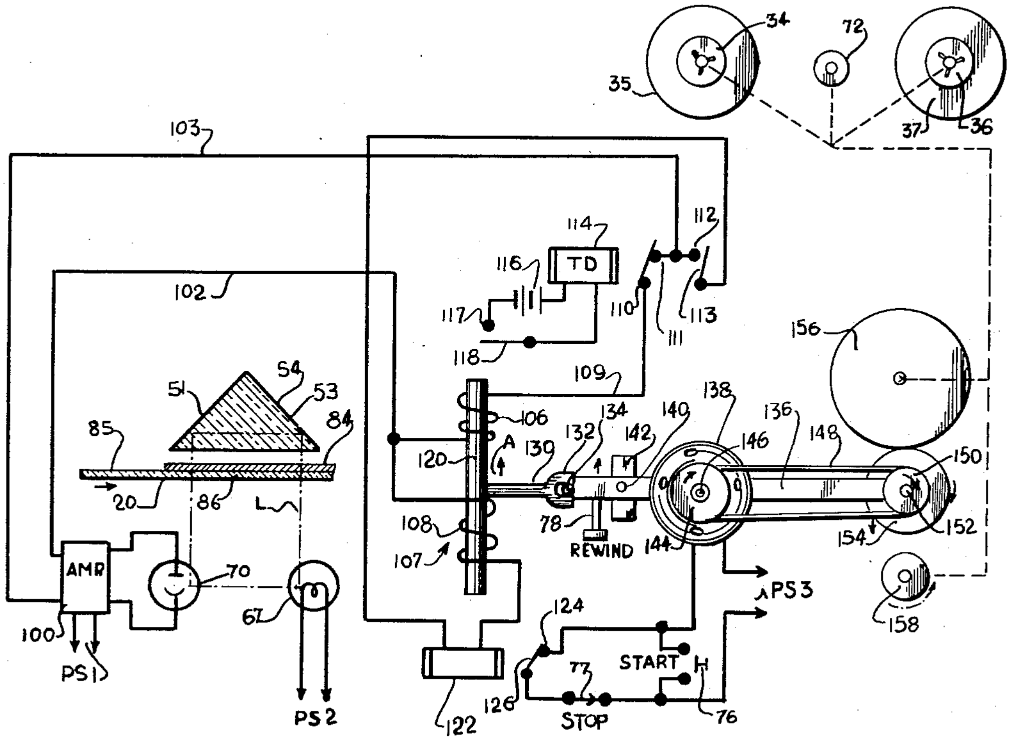
Fig. 4 is a diagrammatic view of a recording system employing the tape magazine or cartridge.

Referring now to Fig. 4, there is shown photoelectric cell 70 which is excited by light from lamp 67 impinging thereon after traveling twice through a transparent portion of tape 20 in a bent light path L. The light path includes the prism 54 from whose inclined sides 51, 53 the light is doubly refracted in passing from the lamp to the photocell. When the opaque portion 84 of the tape is interposed in front of the prism the light path L is blocked and the photoelectric cell is not excited. The lamp is energized by power source PS2.

Connected to the photoelectric cell is an amplifier 100 which amplifies pulses applied by the photoelectric cell. The amplifier is energized by a suitable power supply PS1. The amplifier is connected via wire 102 to opposing terminals of coils 106 and 108 of a solenoid 107. The amplifier is connected via wire 103 to contact 111, 112 of a time delay relay 114. The relay has a pair of normally closed contacts 110, 111 and a pair of normally open contacts 112, 113. The relay coil is in series with a power source or battery 116 and a fixed switch contact 117. A movable contact 118 is normally open with respect to contact 117 and is disposed for closure therewith by plunger 120 which is associated with the solenoid coils 106 and 108. Coil 106 of the solenoid is connected via wire 109 to movable contact 110 of the time delay relay 114. Coil 108 is in series with the coil of relay 122. This relay is an instant acting type having normally closed contacts 124, 126. In series with the contacts is a manually operable single pole stop switch 77. A manually operable push button start switch 76 is connected across contacts 124, 126 for shorting them temporarily when necessary to start the tape drive.

Plunger 120 carries an arm 130 having a bifurcated or forked end 132 engaged with a pin 134 on a lever 136. This lever carries a motor 138 and is pivotable on a shaft 140 supported by a bracket 142. A pulley 144 is carried on the shaft 146 of the motor and drives an endless belt 148 engaged with a pulley 150 rotatably supported on lever 136. Secured to the shaft 152 of pulley 150 is a friction wheel 154 which is engaged with and drives a larger drive wheel 156 when the lever is in one position and which drives a smaller wheel 158 when the lever is in another position.

Wheels 156 and 158 are operatively connected to drive the reels 35, 36 and capstan 72 in one direction when wheel 156 is engaged by wheel 154 and in an opposite direction when wheel 158 is engaged by wheel 154. When the plunger 120 is in the position shown in the drawing, wheel 156 is being driven by wheel 154 at a slower speed than the speed of wheel 154 because wheel 156 is larger in diameter. When the plunger 120 is retracted upon actuation of coil 106, then lever 136 is pivoted to engage wheel 154 with wheel 158 so that the reels and capstan are driven in a reverse direction at a higher speed than previously because wheel 158 is smaller than wheel 156. A manually operable rewind control button or handle 78 is attached to lever 136.

In describing operation of the system of Fig. 4, it will be assumed that the recorder is playing or recording in conventional fashion while the motor is driving the tape 20 from reel 35 to 36 in the tape magazine 10. All components are in the position shown in the drawing. The trailing end of the opaque layer 84 on tape 20 is at prism 54 and the transparent trailing end 85 of the tape is approaching the prism. Suppose now that the transparent section 85 becomes disposed between window 52 and the prism; this will clear the optical path L so that photoelectric cell 70 will be excited by the light of lamp 67 passing through the transparent tape section 85 and the prism 54. When the cell 70 becomes excited it actuates the amplifier 100 whose output is applied to coil 106. The solenoid 107 becomes energized and the plunger 120 is retracted in the direction indicated by arrow A. This pivots lever 136 and the wheel 154 leaves wheel 156 and contacts wheel 158 to drive the tape at increased speed to rewind the tape on the reel 35.

When plunger 120 is retracted by coil 106, it closes switch contact 118 with contact 117 so that the relay 114 becomes energized. The normal time of operation of the relay is about ten to twenty seconds. This is an operation time range of many conventional, commercially available thremal delay relays. After the prescribed time delay, relay 114 closes contacts 112, 113 and opens contacts 110, 111. As a result the circuit of coil 106 is opened and the circuit of coil 108 is closed. The travel of the tape continues in reverse direction rewinding up on reel 35 until the transparent leading end 87 of the tape reaches the prism 54. Now the coil 108 becomes energized by the amplifier 100 via relay 122. The plunger is now retracted by coil 108 so that wheel 154 contacts wheel 156. This restores the original slower speed drive position for recording or playing the apparatus. However, when current passes through the coil of relay 122, contacts 124, 126 open which opens the power supply circuit of motor 138. Since the motor is normally supplied with power via the normally closed contacts 124, 126 and power supply terminals PS3, the opening of its power supply circuit stops the motor.

If it is desired to start the motor, it is necessary to advance the tape so that the leading end passes beyond the optical path L. This is accomplished by manually closing push button 76 for a few seconds. This will cause the tape to be driven until the opaque layer 84 reaches the prism, whereupon the coil 108 will become deenergized along with relay 122 and contacts 124, 126 will close. The push button 76 can then be released, since the motor circuit will now be completed through contacts 124, 126. If it is desired to rewind the tape at high speed at any point of its travel, the rewind control knob 78 can be operated to pivot lever 136 and engage wheels 158 and 154.

If manual rewind is effected, this will be equivalent to actuation of the plunger by coil 106. Relay 114 will become energized and will close contacts 112, 113 while opening contacts 110, 111. Then when the leading end 87 of the tape reaches the optical path L, the motor will be stopped by operation of relay 122.

The tape magazine or cartridge described is thus provided with photoelectrically controlled means whereby the looped ends of the tape cannot be disengaged from their respective reels due to overrun of the tape. Also the cartridge is provided with a tape adapted by its transparent ends to operate the photoelectric control means so that the tape is automatically stopped and reversed. The invention permits the tape to carry as many recording tracks as desired and to record or reproduce in either direction of travel of the tape while rewind takes place in the opposite direction.

The cartridge 10 can be inverted so that reel 35 rotates on spindle 44 and reel 37 rotates on spindle 42. The cartridge structure permits both reels to be handled at once without the necessity of rethreading a tape end on either reel.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. In a magnetic tape recorder, a base, a magnetic tape cover mounted on said base, said base and cover constituting a substantially closed casing, a pair of reels rotatably mounted in the casing, a tape having opposite transparent ends engaged on the reels and transportable in a path therebetween, said casing having an indented portion, said tape passing through a wall of the casing in said portion so that the tape passes outside of the casing for cooperation with magnetic heads disposed in said path, and means excitable in the presence of said transparent portions for stopping and reversing direction of motion of the tape, said means comprising a photoelectric cell disposed adjacent to said wall of the casing on said body, a lamp disposed near said cell and arranged to pass light into the casing through a transparent portion of the tape, and an optical leement for reflecting light from the lamp back through the tape to said cell, said optical element being a fixed prism disposed adjacent the tape within the casing, with the tape being interposed between the prism and said wall, said lamp and cell being disposed outside the casing.

2. A magnetic tape cartridge, comprising a substantially closed casing, a pair of reels rotatably mounted in the casing, a tape having a magnetized opaque central portion with opposite transparent ends, said ends being engaged on the reels and transportable in a path therebetween, said casing having an indented portion, said tape passing through a wall of the casing in said portion so that the tape passes outside of the casing for a portion of said path, and optical means in the casing located adjacent to the tape for transmitting light through the transparent ends thereof to a photoelectrically controlled element outside the casing, said means being a fixed prism having faces inclined to the tape and providing double refracting surfaces for said light, said tape and said indented portion defining a space in a horizontal plane for receiving a capstan to drive the tape and for receiving magnetic heads to record signals to the tape and reproduce signals from the tape.

References Cited in the file of this patent

UNITED STATES PATENTS

| | | |
|---|---|---|
| 2,584,733 | Owens | Feb. 5, 1952 |
| 2,674,917 | Summerhayes | Apr. 13, 1954 |
| 2,683,568 | Lindsay | July 13, 1954 |

FOREIGN PATENTS

| | | |
|---|---|---|
| 808,096 | Great Britain | Jan. 28, 1959 |